March 24, 1953  W. B. WOODRING  2,632,781
DRY CELL
Filed Sept. 17, 1948
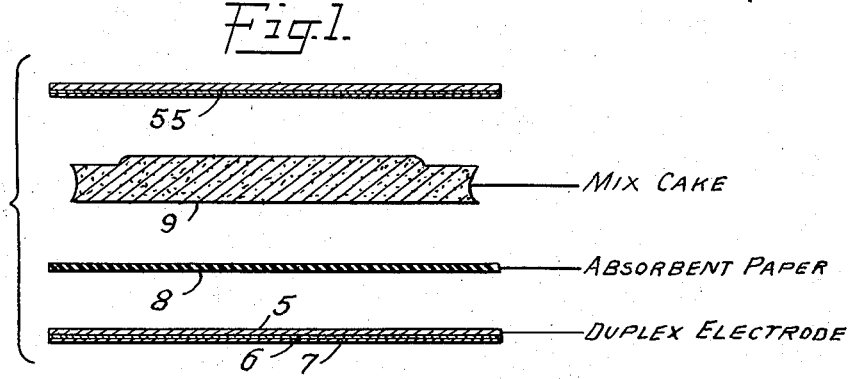
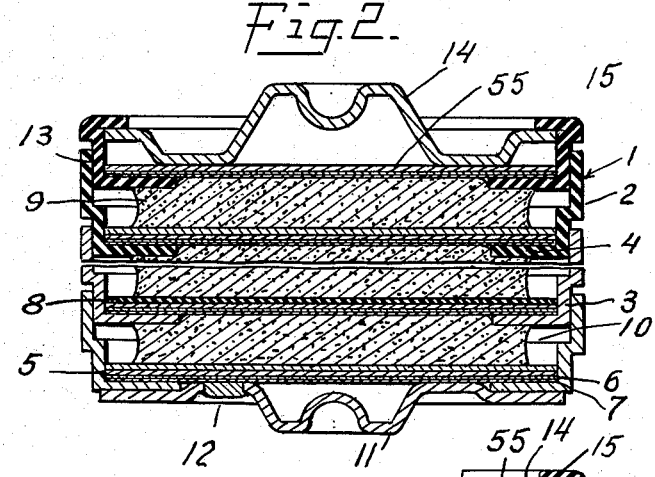
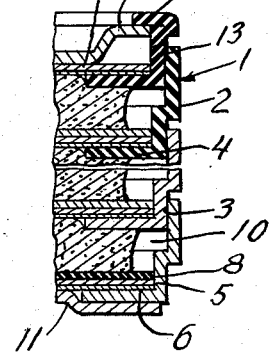
INVENTOR
WILLIAM B. WOODRING
BY
Pennie Edmonds, Morton & Barrows
ATTORNEYS Patented Mar. 24, 1953

2,632,781

UNITED STATES PATENT OFFICE 2,632,781

DRY CELL

William B. Woodring, Hamden, Conn., assignor to Olin Industries, Inc.

Application September 17, 1948, Serial No. 49,713

9 Claims. (Cl. 136—111)

This invention relates to primary batteries and more particularly to an improvement in "flat type" batteries.

The present invention is directed to the type of flat battery in which groups of cell elements are arranged in individual containers and a plurality of such containers are then assembled to form a battery of the desired size and capacity. In my copending application, Serial No. 656,205, filed March 22, 1946 (now Patent No. 2,526,789, granted October 24, 1950), I have disclosed and claimed a battery of this type employing separate cathodes and anodes and in which the electrodes are provided with conductive coatings to seal them to the opposite sides of the bottom of each container and to each other through openings in the bottoms of the containers.

The present invention is directed to that type of flat battery of my copending application in which a duplex electrode is employed. While duplex electrodes are known, the present construction is an improvement over constructions heretofore used in that the carbonaceous coating, which forms the cathode element, is of such nature that it will adhere strongly to the zinc and is also heat sealable to the material of which the container is made.

In carrying out the invention I employ a carbonaceous conductive composition having a thermoplastic resin binder. In the manufacture of the elements of the cell, the conductive coating is first applied to a zinc strip and this zinc strip is subdivided to form the duplex electrodes of the required size. Such an electrode is then inserted in a plastic tray with the conductive thermoplastic composition in contact with the bottom of the tray. The duplex electrode is then sealed to the bottom of the tray, preferably by pressing a heated punch against the uncoated side of the electrode to weld the electrode to the bottom of the tray and form a perfect seal. Because of the necessity of first applying the coating to the zinc and, after it has set, sealing it to the bottom of the tray, it is thus necessary to employ a thermoplastic resin. With many of the materials of which the container may be made, this coating may consist of a vinyl chloride-acetate copolymer, a suitable plasticizer, finely divided conductive carbon and a suitable solvent. Such a coating, however, will not adhere properly to a plastic tray formed of plasticized cellulose acetate-butyrate composition. When the trays are made of such material, the zinc is provided with an initial coating of the type described above and with a second coating which will adhere strongly both to the first coating and to the material of which the tray is formed. This second coating may consist of polyvinyl acetate resin, acetylene black or other finely divided carbon, a suitable plasticizer and a solvent. In either case, the result is a container composed of a suitable dielectric material having side walls and an inwardly extending shelf or flange with the bottom closed by means of a metal plate coated on one side with a conductive thermoplastic composition welded to one side of the flange.

In the accompanying drawing I have shown several embodiments of the invention. In this showing:

Fig. 1 is a vertical sectional view of the elements with the parts separated for clarity of presentation, the tray or container being omitted.

Fig. 2 is a similar view of a battery formed of a plurality of units of the type shown in Fig. 1, each of these figures showing a duplex electrode provided with the double coating referred to above; and Fig. 3 is a detailed, sectional view of a portion of a battery in which the duplex electrode is formed by coating the zinc strip with a single coating.

Referring to Figs. 1 and 2 of the drawing, the reference numeral 1 designates generally a tray which may be made of any suitable shape but which as shown is substantially rectangular in horizontal cross section. This tray may be made of any dielectric material and is preferably made of a thermoplastic composition, such as the thermoplastic synthetic resins now known. I may thus employ vinyl resins, various cellulose compounds and other materials possessing the desired dielectric properties and also possessing thermoplastic properties. The tray may be made of sufficient thickness to be substantially rigid and to give sufficient strength to the assembly to eliminate the necessity of an outer casing. It is preferably formed with straight side walls 2 which are flanged or stepped as at 3 to permit nesting of a plurality of the trays as shown in Figs. 2 and 3. It is also provided with an inwardly extending shelf or flange 4 forming a bottom having an opening therein of appreciable size.

In constructing a battery, I first form a duplex electrode consisting of a sheet 5 of zinc which, in the form of the invention shown in Figs. 1 and 2, is provided with coatings 6 and 7. The coating 6, which is next to the zinc, preferably comprises a vinyl chloride-acetate copolymer, such as Vinylite VMCH 100 parts; a suitable plasticizer, such as dioctyl phthalate 35 parts; finely conductive carbon, such as acetylene black, 30 parts; and sufficient solvent to render the mixture of the proper fluidity for the coating process. As a solvent I may employ methyl ethyl ketone or acetone. This mixture is deposited on the zinc strip to the desired thickness (about 0.015" after drying) by spraying, by a doctor blade coating process, or preferably by a roller coating process. The solvent is then removed by evaporation.

When the tray is formed of a plasticized cellulose acetate-butyrate composition, to which the above mentioned coating does not adhere too well, the zinc is then provided with the second coating 7. This may be of the following composition: a polyvinyl acetate resin, such as "Gelva V-15" 350 parts; acetylene black or other finely divided conductive carbon 100 parts; a plasticizer, such as tricresyl phosphate 70 parts; and a solvent. The solvent as mentioned above may be acetone or ethyl methyl ketone. The coating 7 may be applied in a similar manner to the coating 6 and the solvent removed by evaporation. While the coating 7 may also be used as a single coating, it is preferably used as stated, because better adhesion is obtained and the possibility of pin holes in the coating is avoided.

The coated strip is then divided into pieces of proper size to form the duplex electrode. Such electrode is then inserted in the tray with the coated side engaging the upper surface of the bottom 4. Then, while the tray is held in a suitable die, a heated punch is pressed against the uncoated side of the electrode to cause it to weld to the tray and form a perfect seal. The group of elements in a tray is completed by placing an absorbent sheet 8 of blotting paper or other fibrous material on top of the zinc plate. This serves as a separator and is preferably provided with a coating of paste on the side adjacent the zinc strip 5. It also carries the usual electrolyte. A mix cake 9 is arranged on top of the separator, the mix cake consisting of a pressed cake of the usual depolarizing mix used in dry cells. It may thus consist of a mixture of powdered carbon and manganese dioxide with a suitable binder to retain the components in cake form. The mix cake is slightly smaller in area than the area of the tray and thus provides an air space 10 when the elements are assembled in the tray.

When a number of such groups of elements have been assembled to form a battery, a negative terminal 11 is secured to the bottom in any suitable manner as by solder 12. An additional tray 13 is placed on top of the assembly, this tray containing a duplex electrode 55 to provide the cathode of the top cell. A positive terminal 14 is secured to the top of the cell in any suitable manner as by turning over the upper edge of the top tray as indicated at 15.

In the form of the invention shown in Fig. 3 of the drawing the construction is as heretofore described except that the second coating 7 on the zinc strip is omitted. Where materials are employed in the construction of the trays to which the coating 6 will adhere, this second coating is unnecessary.

The provision of a duplex electrode of the type herein described which will adhere strongly to the zinc anode and is also heat sealable to the dielectric material produces a battery having improved characteristics and performance. The carbonaceous coating is also impermeable to the electrolyte and chemically resistant thereto. By employing coatings containing a thermoplastic binding, the construction of the cell lends itself to present practice in which the coating is first applied to the zinc in zinc strips and, because of its thermoplastic nature, may be subsequently sealed to the bottom of the tray or container.

After a number of such battery groups or elements have been formed by placing the separator and the mix cake on top of the duplex electrode, the battery is assembled by superposing a series of such elements and sealing them together. While I preferably employ a substantially rigid tray or container of suitable plastic dielectric material to eliminate the necessity of an outer casing, the invention may be used in the manufacture of flat batteries in which the containers for the individual elements consist of a flexible dielectric material, such as rubber, either natural or synthetic. In such construction the zinc is first coated with the coating 6 as heretofore described, but in place of the coating 7 I employ a similar coating containing a finely divided carbonaceous material, such as acetylene black, and a binder consisting of a natural or synthetic rubber material.

While I preferably weld the duplex electrode to the bottom of the container by a heat sealing operation, this step can be accomplished by solvent sealing. To accomplish this, the conductive adhesive coating would be sprayed with solvent, inserted in the tray and then welded by means of pressure without heat.

I claim:

1. A battery element comprising a container of dielectric cellulose acetate-butyrate composition having side walls and a bottom provided with a central opening, and a duplex electrode comprising a zinc strip having a layer of a conductive vinyl chloride-acetate copolymer composition adhered to one surface thereof and a coating of a conductive polyvinyl acetate composition adhered to said layer, the coating being heat-sealed to the bottom of the container.

2. A battery element comprising a dielectric member of cellulose acetate-butyrate composition provided with a central opening, and a duplex electrode comprising a zinc strip having a layer of a conductive vinyl chloride-acetate copolymer composition adhered to one surface thereof and a coating of a conductive polyvinyl acetate composition adhered to said layer, the coating being sealed to the member around the said opening.

3. A battery element comprising a member of dielectric material having a central opening, and a duplex electrode comprising a zinc strip having a layer of a conductive carbonaceous electrolyte-resistant composition adhered to one surface thereof and a coating of a conductive thermoplastic cement adhered to said layer, the coating being sealed to the member around the said opening.

4. A battery element comprising a member of dielectric material having a central opening, and a duplex electrode comprising a zinc strip having a layer of a conductive vinyl-chloride-acetate copolymer adhered to one surface thereof and a coating of a conductive thermoplastic cement adhered to said layer, the coating being sealed to the member around the said opening.

5. A battery element comprising a member of dielectric material having a central opening, and a duplex electrode comprising a zinc strip having a layer of a conductive carbonaceous electrolyte-resistant composition adhered to one surface thereof and a coating of a conductive polyvinyl acetate cement adhered to said layer, the coating being sealed to the member around the said opening.

6. A battery element comprising a member of dielectric material having a central opening, and a duplex electrode comprising a zinc strip having a conductive layer adhering thereto and forming a good bond therewith, the conductive layer comprising two strata, with the outer stratum having thermoplastic properties and being sealed from a softened state directly against said dielectric member around the opening thereof.

7. A battery element as defined in claim 6 in which the dielectric member is a tray with the opening in the bottom thereof.

8. A battery comprising a series of superposed cells, each cell comprising a member of dielectric material having a central opening, a duplex electrode comprising a zinc strip having a conductive layer adhering thereto and forming a good bond therewith, said conductive layer comprising two strata, with the outer stratum having thermoplastic properties and being sealed from a softened state directly against said dielectric member around the opening thereof, a separator at the side of the zinc strip remote from said layer, and a mix cake at the side of the separator remote from the zinc strip, said cells being superposed so that the mix cake of one cell contacts the conductive layer of the duplex electrode of an adjacent cell and makes a good contact therewith.

9. A battery element as defined in claim 8 in which the dielectric member is a tray with the opening in the bottom thereof.

WILLIAM B. WOODRING.

REFERENCES CITED

The following references are of record in the file of this patent:

UNITED STATES PATENTS

| Number | Name | Date |
|---|---|---|
| 2,154,312 | MacCallum | Apr. 11, 1939 |
| 2,375,875 | Sanderson | May 15, 1945 |
| 2,418,442 | Wiencke | Apr. 1, 1947 |
| 2,444,034 | Collings et al. | June 29, 1948 |
| 2,475,152 | Rock | July 5, 1949 |
| 2,487,985 | Ruben | Nov. 15, 1949 |

FOREIGN PATENTS

| Number | Country | Date |
|---|---|---|
| 554,926 | Great Britain | July 26, 1943 |